(12) United States Patent
Anschuber et al.

(10) Patent No.: US 10,899,353 B2
(45) Date of Patent: Jan. 26, 2021

(54) METHOD FOR OPERATING A VEHICLE/TRAILER UNIT, VEHICLE/TRAILER UNIT, TOWING VEHICLE, AND IMPLEMENT

(71) Applicant: AVL COMMERCIAL DRIVELINE & TRACTOR ENGINEERING GMBH, Steyr (AT)

(72) Inventors: Siegfried Anschuber, Eberstalzell (AT); Gerhard Stempfer, Garsten (AT)

(73) Assignee: AVL Commercial Driveline & Tractor Engineering GmbH, Steyt (AT)

( * ) Notice: Subject to any disclaimer, the term of this patent is extended or adjusted under 35 U.S.C. 154(b) by 323 days.

(21) Appl. No.: 15/574,616

(22) PCT Filed: May 20, 2016

(86) PCT No.: PCT/EP2016/061434
§ 371 (c)(1),
(2) Date: Jan. 8, 2018

(87) PCT Pub. No.: WO2016/185022
PCT Pub. Date: Nov. 24, 2016

(65) Prior Publication Data
US 2018/0134300 A1    May 17, 2018

(30) Foreign Application Priority Data
May 20, 2015 (DE) .................... 10 2015 209 245

(51) Int. Cl.
*B60W 10/08* (2006.01)
*B60W 30/18* (2012.01)
(Continued)

(52) U.S. Cl.
CPC ....... *B60W 30/18136* (2013.01); *B60K 6/485* (2013.01); *B60W 10/08* (2013.01);
(Continued)

(58) Field of Classification Search
None
See application file for complete search history.

(56) References Cited

U.S. PATENT DOCUMENTS

| 6,318,487 B2 | 11/2001 | Yanase et al. |
| 2004/0162187 A1 | 8/2004 | Suzuki |

(Continued)

FOREIGN PATENT DOCUMENTS

| DE | 4446485 | 6/1996 |
| DE | 102010003000 | 9/2011 |

(Continued)

OTHER PUBLICATIONS

International Search Report prepared by the European Patent Office dated Aug. 17, 2016, for International Application No. PCT/EP2016/061434.

(Continued)

*Primary Examiner* — Charles A Fox
*Assistant Examiner* — Ryan P Dodd
(74) *Attorney, Agent, or Firm* — Sheridan Ross P.C.

(57) ABSTRACT

The invention relates to a method for operating a vehicle/trailer unit, an appropriately designed vehicle/trailer unit, as well as a towing vehicle and an implement for such a vehicle/trailer unit, with the vehicle/trailer unit having a towing vehicle and an implement. The towing vehicle has a combustion engine and a first machine that can be operated as a prime mover, as well as a first axle that can be driven by means of the combustion engine, with it being possible for the combustion engine to be driven by means of the first machine. The implement has a second machine that can be operated as a work machine and a second axle that is mechanically coupled with the second machine. When the vehicle/trailer unit is in overrun mode and/or braking mode, the vehicle/trailer unit can be operated in a first operating (Continued)

mode in which the second machine is operated as a work machine and driven by means of the mechanical kinetic energy of the second axle, while the first machine is operated as a prime mover and drives the combustion engine, with it being possible for at least a portion of the energy generated by the second machine to be utilized to drive the first machine.

19 Claims, 5 Drawing Sheets

(51) Int. Cl.
*B60K 6/485* (2007.10)
*B60W 20/00* (2016.01)
*B60W 20/15* (2016.01)
*B60W 10/119* (2012.01)
*B60W 10/198* (2012.01)
*B62D 59/04* (2006.01)

(52) U.S. Cl.
CPC ........ *B60W 10/119* (2013.01); *B60W 10/198* (2013.01); *B60W 20/00* (2013.01); *B60W 20/15* (2016.01); *B60W 30/18127* (2013.01); *B62D 59/04* (2013.01); *B60W 2300/14* (2013.01); *B60W 2300/152* (2013.01); *B60Y 2200/145* (2013.01); *B60Y 2200/221* (2013.01); *Y02T 10/62* (2013.01)

(56) References Cited

U.S. PATENT DOCUMENTS

| | | |
|---|---|---|
| 2005/0000739 A1 | 1/2005 | Leclerc |
| 2009/0145679 A1 | 6/2009 | Simon et al. |
| 2011/0005848 A1 | 1/2011 | Kvist et al. |
| 2012/0168234 A1* | 7/2012 | Hellholm .............. B60K 6/46 180/14.2 |
| 2012/0193154 A1* | 8/2012 | Wellborn .............. B62D 59/04 180/14.2 |
| 2014/0129067 A1* | 5/2014 | Furukawa ............. B60K 6/442 701/22 |
| 2014/0148984 A1 | 5/2014 | Nishi et al. |

FOREIGN PATENT DOCUMENTS

| | | |
|---|---|---|
| DE | 102010063568 | 6/2012 |
| DE | 102013021608 | 4/2015 |
| JP | 2004-268901 | 9/2004 |
| JP | 2012-126305 | 7/2012 |

OTHER PUBLICATIONS

English Translation of the International Preliminary Report on Patentability for International (PCT) Patent Application No. PCT/EP2016/061434, dated Nov. 30, 2017, 9 pages.

Official Action with machine English Translation for Japan Patent Application No. 2018-512492, dated Jul. 27, 2020, 10 pages.

* cited by examiner

METHOD FOR OPERATING A VEHICLE/TRAILER UNIT, VEHICLE/TRAILER UNIT, TOWING VEHICLE, AND IMPLEMENT

CROSS REFERENCE TO RELATED APPLICATIONS

This application is a national stage application under 35 U.S.C. 371 and claims the benefit of PCT Application No. PCT/EP2016/061434 having an international filing date of 20 May 2016, which designated the United States, which PCT application claimed the benefit of German Patent Application No. 10 2015 209 245.3 filed 20 May April 2015, the disclosure of each of which are incorporated herein by reference in their entireties.

The invention relates to a method for operating a vehicle/trailer unit, wherein the vehicle/trailer unit has a towing vehicle, particularly a towing vehicle that is embodied as a tractor or self-driving work machine, and at least one implement that can be mechanically connected to the towing vehicle and coupled therewith, particularly electrically and/or hydraulically, for energy transfer, particularly at least one trailer. The towing vehicle has a combustion engine and at least one first machine that can be operated as a prime mover, as well as at least one first axle that can be driven by means of the combustion engine, with it being possible for the combustion engine to be driven by means of the first machine. The implement has at least one second machine that can be operated as a work machine and at least one second axle that is mechanically coupled with the second machine.

Moreover, the invention relates to a previously-described vehicle/trailer unit as well as to a towing vehicle for such a vehicle/trailer unit and an implement for such a vehicle/trailer unit.

Vehicle/trailer units of this generic type, as well as towing vehicles and implements of this generic type and methods of this generic type for operating such vehicle/trailer units are inherently known from the prior art.

In particular, towing vehicles are known which have a combustion engine and a machine that can be operated as a prime mover, with the combustion engine generally being an electric machine that can be operated as an electric motor that is provided as a starter motor for the combustion engine and/or as a prime mover for an auxiliary drive.

Furthermore, trailers with recuperative brake are known which have a work machine that is coupled with at least one axle and can be driven by the mechanical kinetic energy of the axle, with the work machine generally being an electric machine that can be operated as a generator.

It is an object of the present invention to provide an alternative method for operating a previously-described vehicle/trailer unit, particularly an improved method that enables a vehicle/trailer unit to be operated more efficiently. The object also includes the provision of an alternative, particularly improved vehicle/trailer unit and the provision of an alternative towing vehicle and an alternative implement.

This object is achieved by means of a method according to the teaching of claim 1, by means of a vehicle/trailer unit according to the teaching of claim 9, as well as by a towing vehicle according to the teaching of claim 21 and by an implement according to the teaching of claim 22. Preferred embodiments of the method according to the invention and of the vehicle/trailer unit according to the invention are the subject matter of the dependent claims. The wording of the claims is incorporated into the content of the description by express reference.

A method according to the invention is characterized in that, when the vehicle/trailer unit is in overrun mode and/or braking mode, the vehicle/trailer unit is operated at least intermittently in a first operating mode in which the second machine is operated as a work machine and driven by means of the mechanical kinetic energy of the second axle and in which the first machine is operated as a prime mover and drives the combustion engine, with at least a portion of the energy generated and/or converted by the second machine being utilized to drive the first machine.

In other words, this means that, according to the invention, when the vehicle/trailer unit is in overrun mode and/or braking mode, the vehicle/trailer unit is operated at least intermittently such that energy is generated and/or converted from mechanical kinetic energy of the second axle of the implement by means of the second machine, which is being operated as a work machine, and is transferred at least partially to a prime mover of the towing vehicle, with this energy being used at least partially for driving the first machine, which is being operated as a prime mover.

In terms of the invention, a "vehicle/trailer unit" is an aggregation of at least one towing vehicle with at least one additional vehicle and/or at least one implement.

A "vehicle" is understood in terms of the invention to be a mobile means of transport. A "towing vehicle" is a vehicle that is designed to pull and/or push other vehicles.

An "implement" is understood in terms of the invention to be a device that can be coupled with a towing vehicle, such as a trailer, a hay tedder, or the like.

In terms of the invention, a "tractor" is understood to be a towing vehicle that is used particularly in agriculture and is designed to pull one or more vehicles but also to drive agricultural machines and/or implements.

A "self-driving work machine" is understood in terms of the invention to be a motor vehicle which, due to its design and special equipment that is securely connected to the vehicle, is intended and suitable for performing work but not for the transporting of people or goods. Some examples of self-driving work machines are harvesting machines, combine harvesters, construction machines, and various special machines such as truck-mounted cranes and the like.

In terms of the invention, a "prime mover" is understood to be a machine that outputs energy.

A "work machine" is understood in terms of the invention to be a machine that can be driven and is designed to consume energy in the form of mechanical work.

A "drivable axle" is understood in terms of the invention to be an axle that can be driven by means of a prime mover.

The use of the energy that is generated from the mechanical kinetic energy of the second axle of the implement to drive the first machine of the towing vehicle enables the especially efficient operation of the vehicle/trailer unit, particularly the energy-efficient operation of the towing vehicle.

In an advantageous development of the method according to the invention, the portion of the energy generated and/or converted by the second machine that is not used to drive the first machine is fed to an energy store, at least in some driving situations.

In an alternative but also advantageous embodiment of a method according to the invention, all of the energy that is generated and/or converted by the second machine is used to drive the first machine, at least in some driving situations.

During operation according to the invention in the first operating mode, the at least one implement, particularly the at least one trailer, is mechanically connected to the towing vehicle and coupled with the towing vehicle for energy transfer, with the implement being preferably electrically and/or hydraulically coupled with the towing vehicle.

It is not absolutely necessary, however, particularly if the vehicle/trailer unit has several implements, for every one of the implements to be directly connected to the towing vehicle and/or coupled directly electrically and/or coupled directly hydraulically with the towing vehicle. One or more implements can also be connected indirectly to the towing vehicle mechanically and/or electrically and/or hydraulically. In particular, two or more implements—two trailers, for example—can be arranged one after another in a row on the towing vehicle, in which case only the implement that is arranged directly behind the towing vehicle is connected directly mechanically to the towing vehicle and coupled directly therewith for energy transfer, and other implements are connected indirectly.

Preferably, the first axle of the towing vehicle, which can be driven by means of the combustion engine, is coupled mechanically with the crankshaft of the combustion engine, particularly via at least one gearbox and one clutch.

The first machine is preferably an electric machine that can be operated as an electric motor, a reciprocating piston engine, or a turbomachine that can be operated as a turbine, particularly a hydraulic engine.

If the towing vehicle is a tractor, it can be advantageous if the first machine is embodied as an axial piston engine.

Preferably, the first machine is coupled mechanically with the crankshaft of the combustion engine, particularly via at least one gearbox, for example a gear train and/or a belt drive.

The second machine is particularly an electric machine that can be operated as a generator or a turbomachine that can be operated as a pump, particularly a hydraulic turbomachine, preferably a hydraulic pump.

If the towing vehicle is a tractor, it can be advantageous in some cases if the second machine is embodied as an axial piston pump or as a gear pump.

Preferably, the first machine and the second machine are coupled directly with one another, particularly electrically or hydraulically. However, the first machine and the second machine can also be coupled together indirectly through interposition of an energy store and/or power electronics.

In an advantageous embodiment of a method according to the invention, the vehicle/trailer unit is operated at least intermittently in overrun mode and/or braking mode while traveling downhill in the first operating mode, preferably all the time while traveling downhill. The substantially greater forces at work while traveling downhill in comparison to driving on level ground—with the acting forces increasing as the slope gradient increases—result in greater mechanical kinetic energy. Therefore, an especially large quantity of mechanical energy can be converted and made available by means of the second machine while traveling downhill. Consequently, especially efficient operation is possible if the downhill travel is exploited to the greatest possible extent in the first operating mode.

In another advantageous embodiment of a method according to the invention, in which the towing vehicle has an engine braking device, a defined engine braking torque is applied at least intermittently by means of the engine braking device to the first axle of the towing vehicle, with the engine braking torque being preferably applied when the vehicle/trailer unit is in overrun mode and/or braking mode, particularly when the vehicle/trailer unit is in the first operating mode. Engine braking devices with which kinetic energy can be converted particularly into thermal energy are inherently known from the prior art, particularly as decompression brakes.

By virtue of the possibility of driving the combustion engine by means of the first machine in overrun mode and/or braking mode, with it being possible for the energy required for this to be made available by the second machine, the engine-braking performance can be augmented substantially. In particular, the other braking systems of the vehicle/trailer unit, particularly braking devices of towing vehicle and implement that do not function in a wear-free manner, can be relieved, with it being especially advantageous that the energy can be generated recuperatively by the second machine in overrun mode and/or braking mode.

In order to increase the braking performance of the combustion engine, other components such as, preferably, an engine fan and/or an air compressor can be additionally coupled with the combustion engine with load torque, particularly in overrun mode and/or braking mode. In towing mode, by contrast, these components, particularly the engine fan and/or the air compressor, can be preferably decoupled from the combustion engine such that they do not effect any load torque on the crankshaft that can be driven by means of the combustion engine, however.

In another advantageous embodiment of a method according to the invention, a defined engine braking torque is applied at least intermittently by means of the engine braking device to the first axle of the towing vehicle while traveling downhill in overrun mode and/or braking mode. In this way, the load of the other braking devices, which are usually embodied as friction-pad brakes and prone to wear, can be substantially reduced. What is more, the danger of brake fading—an unwanted diminishing of the braking effect as a result of the heating or overheating of the brake that can result in a safety-critical lengthening of the braking distance—can be reduced. Another advantage is that the engine braking device works in a nearly wear-free manner.

In another advantageous embodiment of a method according to the invention, a defined braking torque is applied at least intermittently by means of a second machine to the second axle of the implement, with the braking torque being preferably applied when the vehicle/trailer unit is in overrun mode and/or braking mode, particularly when the vehicle/trailer unit is in the first operating mode.

In another advantageous embodiment of a method according to the invention, a defined braking torque is applied by means of the second machine to the second axle of the implement at least intermittently while traveling downhill, particularly if the vehicle/trailer unit is composed of a towing vehicle and a very heavy implement. After all, it can be advantageous particularly when traveling downhill to also brake the implement in order to maintain the stability of the vehicle/trailer unit.

Through the application of the braking torque to the second axle by means of the second machine, the load of the braking device of the implement, which is usually embodied as a friction-pad brake and is prone to wear, can be substantially reduced in a simple manner and even avoided completely on small slope gradients. In particular, the thermal loading and thus the danger of fading can be reduced substantially. A defined braking torque can also be applied in a nearly wear-free manner to the second axle by means of the second machine.

If the vehicle/trailer unit has a control device for controlling the first machine and the engine braking device and/or the second machine, the first machine and/or the engine braking device and/or the second machine are preferably controlled such that a defined engine braking torque is applied to the first axle of the towing vehicle and/or a defined braking torque is applied to the second axle of the implement, with the defined engine braking torque and/or the defined braking torque being preferably applied as a function of a determined driving state.

In another advantageous embodiment of a method according to the invention, the first machine and/or the engine braking device and/or the second machine are controlled such that a defined braking torque distribution is achieved between the engine braking torque applied by means of the first machine and/or the engine braking device to the first axle of the towing vehicle and the braking torque applied by means of the second machine to the second axle of the implement.

In another advantageous embodiment of the method according to the invention, the braking torque distribution is set such that a defined stretching or compressing of the vehicle/trailer unit is achieved, with the defined braking torque distribution being preferably set as a function of the current compression or stretching.

Alternatively or in addition, the defined braking torque distribution can also be set as a function of variables other than stretching or compression, particularly in a lag-optimized manner, for example as a function of a vehicle/trailer unit speed or a brake pedal pressure or slip. The slip on the wheels of the drive axle of the towing vehicle and on the wheels of the drive axle of the implement is preferably set by adjusting a drive power and/or a braking power by appropriately controlling the first machine and/or the second machine.

In particular, the engine braking torque and/or the braking torque can be applied to the first axle of the towing vehicle and/or the second axle of the implement such that a desired, defined torque distribution is achieved between a towing vehicle total drive torque that is acting on the towing vehicle and an implement total drive torque that is acting on the implement, thereby achieving a desired, defined stretching or compressing and/or a desired, defined slip.

In order to set the braking torque distribution as a function of the current compression or stretching, the current stretching and/or compression is preferably determined, particularly directly or indirectly, with it being possible for the stretching to be determined directly by means of a force-measuring device between towing vehicle and implement, for example, or indirectly from detected wheel speeds of towing vehicle and implement, and the actual vehicle speed.

In order to ensure that the vehicle/trailer unit can be safely started up, the implement must be prevented from pushing the vehicle/trailer unit. This can be achieved by setting a defined amount of stretching or compressing when starting.

For this purpose, in another advantageous embodiment of the method according to the invention, particularly for starting downhill from a braked standstill in the direction of forward travel, with the vehicle/trailer unit being held by means of an additional braking device in order to bring about a stretching of the vehicle/trailer unit when starting downhill in the direction of forward travel, in a first step upon release of the additional braking device the second machine is controlled such that a braking torque is applied by means of the second machine to the second axle of the implement such that the implement is held at a standstill until a defined stretching of the vehicle/trailer unit has been achieved as a result of the forward motion of the towing vehicle after the additional braking device is released. In a second step, the braking torque applied by means of the second machine is gradually reduced such that the defined stretching that is achieved remains nearly constant until the implement has reached the same vehicle speed as the towing vehicle. In case of the further acceleration of the implement, the braking torque is increased again as necessary in one or more steps by means of the second machine such that a defined stretching continues to be maintained while traveling downhill.

Preferably, the vehicle/trailer unit can be operated in a first operating mode or in at least one additional operating mode as a function of a determined driving state.

For this purpose, the first machine can also be preferably operated as a work machine, and the second machine also as a prime mover, and the second axle is preferably a drivable axle, particularly an axle that can be driven electrically and/or hydraulically.

In another advantageous embodiment of a method according to the invention, the first machine is operated as a work machine at least in one additional operating mode, particularly in a second operating mode, and driven by means of the combustion engine, with the second machine being operated as a prime mover and driving the drivable axle of the implement, and with the first machine and the second machine being coupled together such that the energy generated by the first machine in generator mode can be utilized to drive the second machine.

In an especially advantageous embodiment of a method according to the invention, the vehicle/trailer unit is operated at least intermittently in a second operating mode when the vehicle/trailer unit is in towing mode.

A vehicle/trailer unit according to the invention has a towing vehicle, particularly a towing vehicle that is embodied as a tractor or self-driving work machine, and at least one implement that can be mechanically connected to the towing vehicle and coupled therewith, particularly electrically and/or hydraulically, for energy transfer, particularly at least one trailer. The towing vehicle has a combustion engine and at least one first machine that can be operated as a prime mover, as well as at least one first axle that can be driven by means of the combustion engine, with it being possible for the combustion engine to be driven by means of the first machine. The implement has at least one second machine that can be operated as a work machine and at least one second axle that is mechanically coupled with the second machine.

According to the invention, the vehicle/trailer unit is embodied such that at least a portion of an energy generated by the second machine can be utilized to drive the first machine.

In other words, a vehicle/trailer unit according to the invention is embodied such that the energy generated and/or converted by the second machine can be transferred at least partially to the towing vehicle, particularly to the first machine. That is, the towing vehicle and the implement can not only be interconnected mechanically, but can be coupled together such that at least a portion of the energy generated by the second machine can be transferred from the implement to the towing vehicle and particularly to the first machine.

In a first embodiment of the towing vehicle, the first machine of the towing vehicle, which can be operated as a prime mover, is preferably an electric machine that can be operated as an electric motor, a reciprocating piston engine, or as a turbomachine that can be operated as a turbine. In an advantageous embodiment of the vehicle/trailer unit, particularly of the implement, the second machine is an electric machine that can be operated as a generator or a turbomachine that can be operated as a pump.

In another advantageous embodiment of a vehicle/trailer unit according to the invention, the first machine of the towing vehicle can also be operated as a work machine and the second machine of the implement can also be operated as a prime mover, and the second axle of the implement, which is mechanically coupled with the second machine, can be driven by means of the second machine.

Preferably, the vehicle/trailer unit, particularly the towing vehicle, has a device for determining at least one driving state and can be operated in a first operating mode or in at least one additional operating mode particularly as a function of a determined driving state; in the at least one additional operating mode, the first machine is operated as a work machine and driven by means of the combustion engine, the second machine is operated as a prime mover and drives the drivable axle of the implement, with the first machine and the second machine being coupled together such that energy generated by the first machine can be utilized for driving the second machine.

For this purpose, in another advantageous embodiment, the first machine is preferably an electric machine that can be operated as an electric motor and as a generator, that is, a so-called motor generator, or a turbomachine that can be operated as a pump and as a turbine, that is, a so-called pump turbine.

The second machine is preferably an electric machine that can be operated as a generator and as an electric motor, that is, a so-called motor generator, or a turbomachine that can be operated as a turbine and as a pump, that is, a so-called pump turbine.

Preferably, the first machine and/or the second machine are each an electric machine that can be operated both as an electric motor and as a generator, that is, a motor generator, or a turbomachine that can be operated both as a turbine and as a pump, that is, a pump turbine.

If the towing vehicle is a tractor, it can be advantageous in some cases if the first machine and/or the second machine is an axial piston engine.

It has proven to be especially advantageous, however, if the second machine is an electric machine that can be operated as an electric motor and as a generator and the first machine is as well, or if the second machine is an electric machine that can be operated as an electric motor and as a generator and the first machine is a pump turbine—that is, a turbomachine that can be operated both as a turbine and as a pump.

Preferably, the towing vehicle and the implement are mechanically interconnected and coupled together for energy transfer, particularly electrically and/or hydraulically, depending on the design of the first machine and of the second machine, particularly depending on the design of the second machine.

If the second machine of the implement is an electric machine that can be operated as a generator, the vehicle/trailer unit is embodied according to the invention such that the electrical energy generated by the second machine, which is embodied as an electric machine, can be transferred to the towing vehicle.

If the second machine is embodied as a turbomachine, for example as a turbine, particularly as a pump turbine, the towing vehicle is preferably coupled with the implement such that the flow energy generated by the second machine can be transferred to the towing vehicle.

In another advantageous embodiment of a vehicle/trailer unit according to the invention, the towing vehicle has an engine braking device, with it being possible for an engine braking torque to be applied by means of the engine braking device at least to the first axle of the towing vehicle. The vehicle/trailer unit is preferably embodied such that the engine braking torque can be applied when the vehicle/trailer unit is in overrun mode and/or braking mode, particularly when the vehicle/trailer unit is in the first operating mode and the combustion engine is driven by the first machine.

In another advantageous embodiment of a vehicle/trailer unit according to the invention, the engine braking device has an exhaust braking device, with the exhaust braking device preferably having at least one exhaust-side control flap with which counterpressure and thus resistance can be applied in the exhaust system, whereby an engine braking torque is generated that acts on the crankshaft of the combustion engine. Exhaust braking devices of this generic type are generally known from the prior art, for example as the so-called Jacobs Exhaust Brake® by Jacobs Vehicle Systems®.

In an alternative or additional advantageous embodiment of a vehicle/trailer unit according to the invention, the engine braking device has a decompression braking device. Decompression braking devices of this generic type are also known from the prior art, for example as the so-called Compression Release Brake by Jacobs Vehicle Systems®.

A "decompression braking device" is understood in terms of the invention to be a braking device that has at least one exhaust valve or an additional valve that can be opened at the end of the compression stroke in order to relieve pressure in the cylinder—that is, in order to perform decompression. As a result, no more work can be transferred to the crankshaft in the expansion stroke, since the energy that was used for the compression has already been discharged through the decompression.

In another alternative or additional advantageous embodiment of a vehicle/trailer unit according to the invention, the engine braking device has a vented braking device. Vented braking devices are also known from the prior art, for example in the form of so-called bleeder brakes, also by Jacobs Vehicle Systems®.

A "vented braking device" is understood in terms of the invention as a braking device that has at least one constant throttle in the form of an additional small valve with a small cross section parallel to the exhaust valves of the combustion engine that can be maintained in a defined open position throughout the entire operation of the engine brake, or as a braking device that has at least one exhaust valve that can be maintained in a defined open position throughout the entire operation of the engine brake.

In another advantageous embodiment of a vehicle/trailer unit according to the invention, the vehicle/trailer unit, particularly the towing vehicle, has at least one control device for controlling the first machine and/or the engine braking device, with the first machine and/or the engine braking device being controlled such that a defined engine braking torque can be applied to the first axle of the towing vehicle.

In another advantageous embodiment of the vehicle/trailer unit, the vehicle/trailer unit, particularly the implement, has at least one control device for controlling the second machine, with the second machine being preferably controlled such that a defined torque, particularly a defined braking torque, can be applied to the second axle of the implement.

In another advantageous embodiment of the vehicle/trailer unit, the vehicle/trailer unit is embodied such that there is a defined braking torque distribution that can be set between the engine braking torque that can be applied by means of the first machine and/or the engine braking device to the first axle of the towing vehicle and the braking torque that can be applied to the second axle of the implement by means of the second machine.

In another advantageous embodiment of the vehicle/trailer unit, the braking torque distribution can be set such that a defined stretching or compressing of the vehicle/trailer unit occurs, with it being preferably possible to set the defined braking torque distribution as a function of the current compression and/or stretching.

That is, the torque distribution can be used to set a defined stretching or compression; in particular, an engine torque and a torque can be applied to the first axle and the second axle such that a desired, defined torque distribution is set between a towing vehicle total drive torque acting on the towing vehicle and an implement total drive torque acting on the implement, thereby achieving the desired, defined stretching or compression.

In another advantageous embodiment of a vehicle/trailer unit according to the invention, particularly of the implement, the implement has, in addition to the second machine, a third machine, with the second machine being coupled mechanically at least with a left wheel of the second axle of the implement, and with the third machine being coupled mechanically at least with a right wheel of the second axle, with it being possible for the second and the third machine to be operated at least as a work machine. As a result, an individual braking torque distribution is enabled not only between towing vehicle and implement, but also between left and right axle side of the implement, whereby the stability of the trailer can be achieved particularly on loose ground and when traveling transverse to the slope.

A towing vehicle according to the invention, particularly towing vehicle according to the invention that is embodied as a tractor or self-driving work machine, is characterized in that it is designed to form a vehicle/trailer unit with an appropriately designed implement in at least a mechanically coupled state.

An implement according to the invention, particularly a trailer according to the invention, is characterized in that it is designed to form a vehicle/trailer unit with an appropriately designed towing vehicle in an at least mechanically coupled state.

This and other features and advantages follow not only from the claims and description, but also from the drawings, with it being possible for each of the individual features to be realized alone or together in the form of subcombinations in an embodiment of the invention and can inherently constitute an advantageous and patentable embodiment, for which protection is likewise claimed.

Some of the cited features and characteristics relate both to a method according to the invention and to a vehicle/trailer unit according to the invention, a towing vehicle according to the invention, and an implement according to the invention. Some of these features and characteristics are only described once but apply independently of one another in the context of technically possible embodiments both for an inventive method and for an inventive vehicle.

In the following, the invention is explained in further detail on the basis of several exemplary embodiments, with the invention being illustrated schematically for this purpose in the enclosed drawings.

Figure 1:
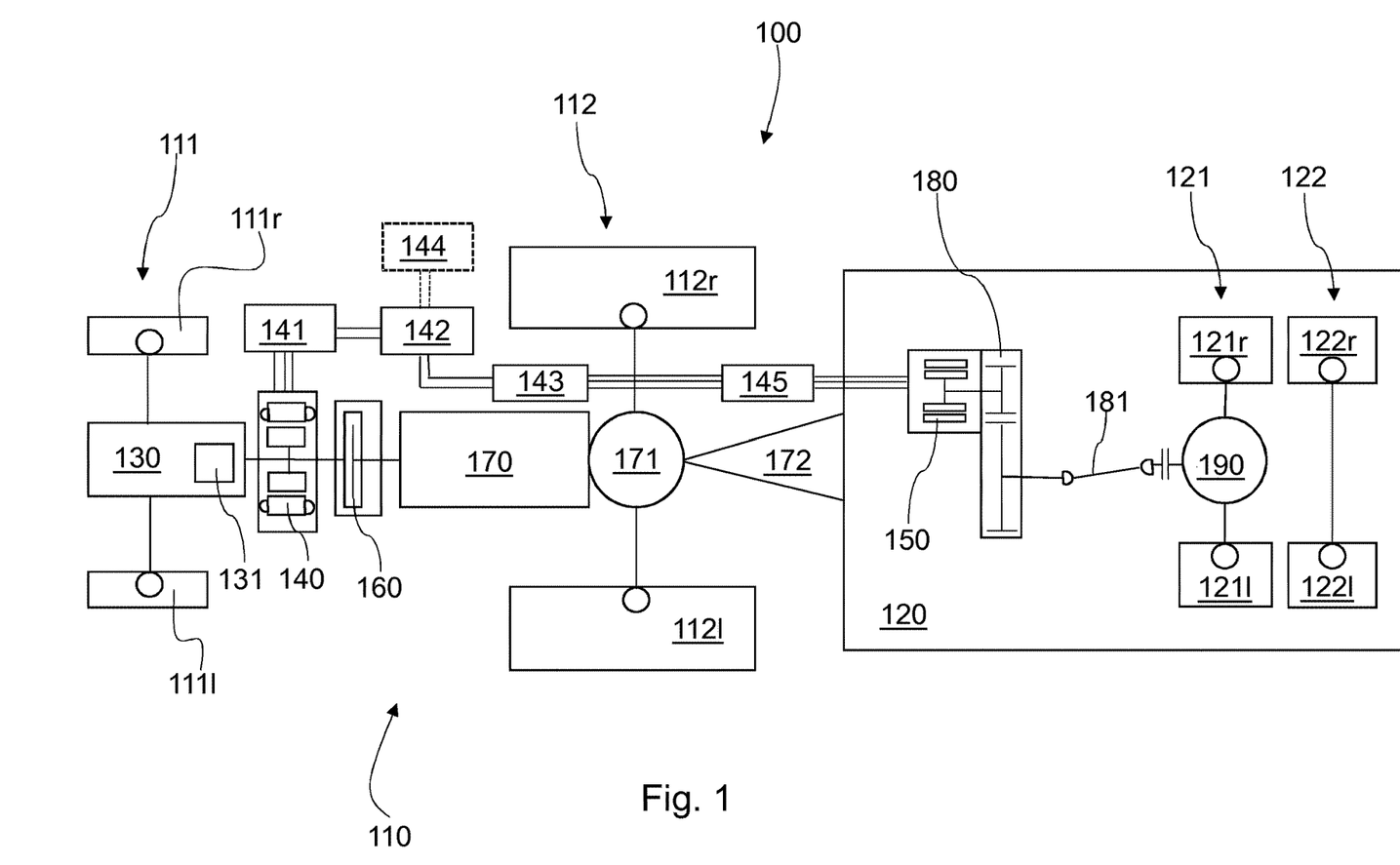
FIG. 1 shows a schematic representation of a first exemplary embodiment of a vehicle/trailer unit according to the invention.

FIG. 1 shows a first exemplary embodiment of a vehicle/trailer unit 100 according to the invention with a first exemplary embodiment of a towing vehicle 110 according to the invention that is coupled both mechanically and electrically with an implement 120 according to the invention in the form of a two-axle trailer.

The mechanical coupling of the towing vehicle is achieved using a drawbar 172, whereas a high-voltage line with an AEF connector 145 is provided for electrical coupling, particularly for transferring electrical energy between the towing vehicle 110 and the implement 120.

The so-called AEF connector 145 is a plug connector that is embodied according to a common standard for agricultural machines, with the abbreviation AEF standing for Agricultural Industry Electronics Foundation, which is additionally designed to transfer electrical energy in the high-voltage range for this vehicle/trailer unit 100.

The towing vehicle 110 according to the invention is two-tracked with a front axle 111 and a rear axle 112, each of which has a left wheel 111$l$ and 112$l$, respectively, and a right wheel 111$r$ and 112$r$, respectively.

In this exemplary embodiment, the towing vehicle 110 is an all-wheel-drive tractor with a combustion engine 130 having an engine braking device 131, with the combustion engine 130 being mechanically coupled with a first machine 140 that is coupled by means of a clutch 160 with the gearbox 170 and, via a rear axle differential 171, with the two wheels 112$l$ and 112$r$ of the rear axle 112. The combustion engine 130 is also coupled with the two wheels 111$l$ and 111$r$ of the front axle 111 and is designed to drive not only the rear axle 112, but also the front axle 111, with the front axle 111 also being coupled with the combustion engine 130 by means of a front axle differential (not shown here) and the gearbox 170.

In this exemplary embodiment, the first machine 140 is an electric machine that can be operated both as an electric motor and as a generator—that is, a motor generator 140 that is both designed to be driven by the combustion engine 130 and provided for the purpose of driving the combustion engine 130.

Moreover, the towing vehicle according to the invention has a first, grounded power converter 141, a power distribution device 142, a second, grounded power converter 132, and an energy store 144.

The first power converter 141 is designed to convert alternating current generated by the first electric machine into direct current, whereas the second power converter 143 is designed to convert direct current transferred from the power distribution device 142 to alternating current and feed it to the AEF connector 145 and, conversely, to convert alternating current to direct current from the current 145 fed via the AEF connector and to transfer it to the power distribution device 142. All or only part of the electrical energy generated can be fed by means of the power distribution device 142 to the energy store 144.

The implement 120 has a second machine 150 which, in this exemplary embodiment of a vehicle/trailer unit 100 according to the invention, is also an electric machine 150 that can be operated both as a generator and as an electric motor—that is, also a motor generator. The second machine 150 is mechanically coupled with a second axle 121 by means of a spur gear 180, a Cardan shaft 181, and a differential gear 190, with it being possible for the wheels 121*l* and 121*r* of the second axle 121 of the implement 120 to be driven electrically by means of the second machine 150. In this case, the implement 120 also has an additional axle 122 with wheels 122*l* and 122*r* which, however, cannot be driven in this exemplary embodiment.

All of the axles of the vehicle/trailer unit 100—that is, all of the axles of both the towing vehicle 110 and implement 120—can be braked in this exemplary embodiment, with an appropriate friction-pad braking device being provided but not shown in further detail.

The vehicle/trailer unit 100 is embodied such that, when it is in overrun mode and/or braking mode, it can be operated at least intermittently in a first operating mode in which, according to the invention, the second machine 150 is operated as a generator and driven by means of the mechanical kinetic energy of the second axle 121, whereas the first machine 140 is operated as a electric motor and drives the combustion engine, with at least a portion of the energy generated by the second machine 150 being utilized to drive the first machine 140.

The electrical energy generated by the second electric machine 150 can be transferred via a high-voltage line (not further specified here) and the AEF connector 145 from the trailer 120 to the towing vehicle 110, particularly to the power converter 143, which converts the alternating current generated by means of the second electric machine 150 to direct current and feeds it to the power distribution device 142, by means of which the transferred electrical energy is distributed to the energy store 144 and/or the power converter 141. The power converter 141 converts the direct current back into alternating current so that the electrical energy is available for driving the first electric machine 140, with which the combustion engine 130 can be driven.

A defined engine braking torque can be applied by means of the engine braking device 131 of the combustion engine 130 at least intermittently to the first axle 112, which can be driven by means of the combustion engine 130.

At the same time, an engine braking torque can be applied when the vehicle/trailer unit 100 is in overrun mode and/or braking mode, particularly when traveling downhill and/or when the vehicle/trailer unit 100 is in the previously-described first operating mode according to the invention. This is especially advantageous because, due to the additional driving of the combustion engine 130 by the first machine 150, an especially high level of engine braking power can be achieved, thereby substantially reducing the loading of the other braking devices, particularly the loading of the friction pad braking devices of the vehicle/trailer unit 100.

In this exemplary embodiment, the trailer 120 according to the invention is embodied such that a defined braking torque can be additionally applied by means of the second electric machine 150 to the second axle 121 of the implement 120, with it being possible for the braking torque to be applied when the vehicle/trailer unit is in overrun mode and/or braking mode, particularly when the vehicle/trailer unit is in the first operating mode.

Moreover, the vehicle/trailer unit has a control device (not shown here) for controlling the first machine 130 and/or the engine braking device 131 and/or the second machine 150, with it being possible for all of the subunits—that is, the first machine 140 and/or the engine braking device 131 and/or the second machine 150—to be controlled in this exemplary embodiment such that a defined engine braking torque can be applied to the first axle of the towing vehicle 110 according to the invention and/or a defined braking torque can be applied to the second axle 121 of the trailer 120 according to the invention. The defined engine braking torque and the defined braking torque can each be applied as a function of a determined driving state.

The engine braking torque and the braking torque that can be applied to the second axle 121 of the trailer 120 can be set such that a defined braking torque distribution is achieved between these two braking torques. In particular, the braking torque distribution can be set such that a defined stretching or compressing of the vehicle/trailer unit 100 occurs, with it being preferably possible to set the defined braking torque distribution in an especially advantageous manner as a function of the current compression and/or stretching.

Figure 2:
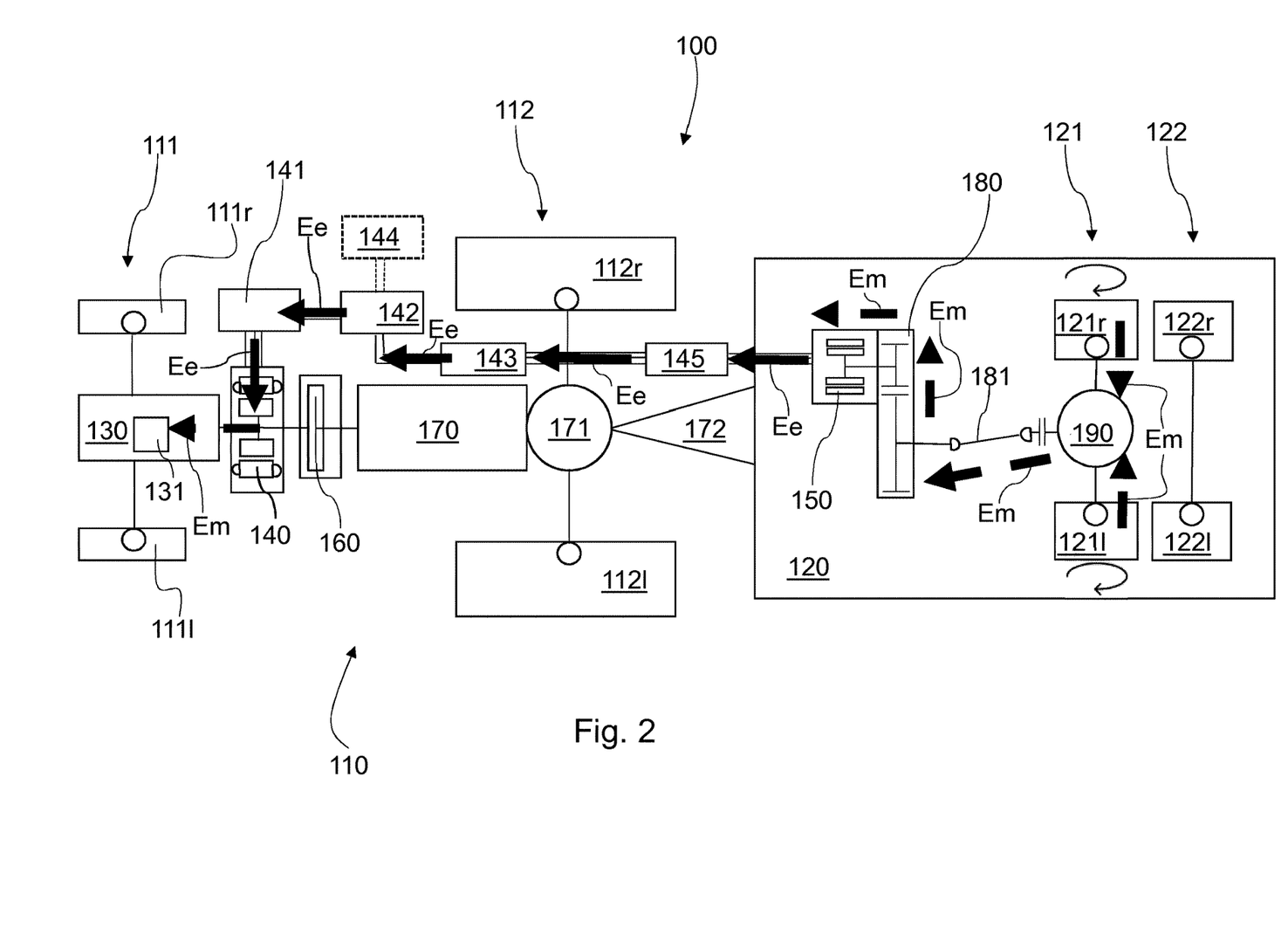
FIG. 2 shows, on the basis of the schematic representation of FIG. 1, the energy flow between the individual subunits of a vehicle/trailer unit according to the invention according to an exemplary execution of a method according to the invention while braking and traveling downhill in the direction of forward travel.

On the basis of FIG. 1, FIG. 2 shows a schematic illustration of the energy flow during the execution of the method according to the invention while traveling forward downhill in overrun mode and/or braking mode during the operation of the vehicle/trailer unit 100 in the first operating mode, with the solid arrows being intended here to symbolize the energy flow of the electrical energy Ee, and with the broken arrows symbolizing the energy flow of the mechanical energy Em.

As was already described in detail with reference to FIG. 1, mechanical kinetic energy Em is produced on the wheels 121L and 121R in this case in the first operating mode as a result of the downhill travel or rolling, which mechanical kinetic energy Em is fed via the axle differential 190 and the Cardan shaft 181 as well as the spur gear 180 of the second electric machine 150, which converts the mechanical kinetic energy Em to electrical energy Ee.

By means of the high-voltage line and the AEF connector 145, the electrical energy Ee is transferred from the implement 120 according to the invention to the towing vehicle 110 according to the invention and fed via the power converter 143 as well as via the interposed power distribution device 142 of the first electric machine 140 and/or to the energy store 144. In this case, all of the electrical energy Ee generated by means of the second electric machine 150 in generator mode is fed to the first electric machine 140 of the towing vehicle 110. The first electric machine 140 is driven with this electrical energy Ee and converts the electrical energy Ee appropriately to mechanical energy Ee, with which the combustion engine 130 is driven.

By the use of the drive power that is additionally applied by means of the first electric machine 140 to the combustion engine 140, the braking power of the existing engine braking device can be substantially increased, since the combustion engine 130 can thus be operated at an operating point that is required for greater braking power, thus resulting in the substantially augmented braking performance of the towing vehicle 110 and, as a result, improved braking performance of the overall vehicle/trailer unit 100. The friction pad braking device of the vehicle/trailer unit can thus be relieved substantially. In particular, it is possible to brake the vehicle/trailer unit with reduced wear.

What is more, by operating the second electric machine 150 as a generator, that is, as a work machine, a braking torque is additionally applied to the wheels 121*l* and 121*r* of the second axle 121 of the trailer 120, whereby particularly the friction pad braking devices of the trailer 120 can be relieved and the trailer 120 can be braked in a wear-free manner.

Moreover, the vehicle/trailer unit 100 is embodied such that the first electric machine 140 can be operated as a generator, that is, as a work machine, so as to generate current, particularly as a result of being driven by means of the combustion engine 130. That is, the energy flow occurs in precisely the opposite direction in this case; see FIG. 3.

Figure 3:
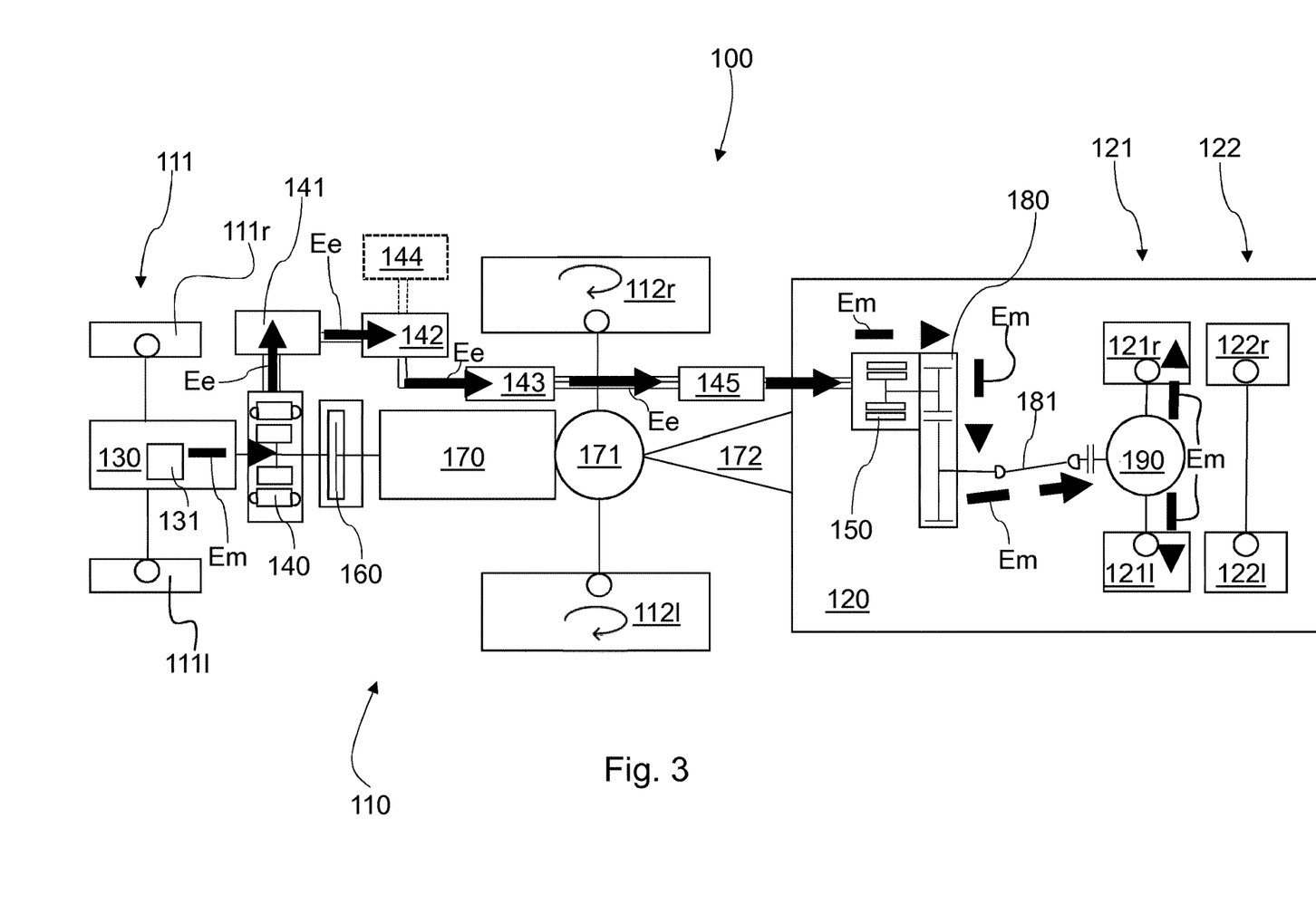
FIG. 3 shows, on the basis of the schematic representation of FIG. 1, the energy flow between the individual subunits of a vehicle/trailer unit according to the invention according to an exemplary execution of the method according to the invention while starting from a stop and traveling downhill in the direction of forward travel.

In this case, mechanical energy Em is transferred from the combustion engine 130 to the first electric machine 140, which is operated as a work machine and supplies generated electrical energy Ee to the power converter 141, from which the electrical energy Ee is transferred via the power distribution device 142 to the power converter 143 and further via the AEF connector 145 to the trailer 120. As will readily be understood, it is possible in this case as well to feed a portion of the electrical energy Ee to the energy store 144.

The electrical energy Ee transferred to the trailer 120 is utilized in this case to drive the second electric machine 150, which converts the electrical energy Ee to mechanical energy Em, which is transferred by means of the spur gear 180 and the Cardan shaft 181 and the axle differential 190 to the two wheels 121*l* and 121*r* of the second axle 121 of the trailer 120.

Furthermore, when starting from a stop in the downhill direction of forward travel with the vehicle/trailer unit held by means of an additional braking device, for example by means of the hand brake or the friction-pad brake (not further specified here), the described vehicle/trailer unit 100 is also designed to first apply a braking torque to the second axle 121 of the implement 120 upon the release of the additional braking device by means of the second machine 150 such that the implement 120 is kept at a stop until a defined stretching of the vehicle/trailer unit 100 has been achieved as a result of the forward motion of the towing vehicle 110 after the releasing of the additional braking device.

In a second step, the braking torque by means of the second machine can then be gradually reduced such that the defined stretching that is achieved remains nearly constant or a desired value is achieved until the implement 120 has reached the same driving speed as the towing vehicle 110.

Where necessary, particularly in case of the further acceleration of the implement 120, the braking torque can be increased and/or adjusted again in one or more steps by means of the second machine 150 such that a defined stretching of the vehicle/trailer unit 100 continues to be maintained during downhill travel.

Figure 4:
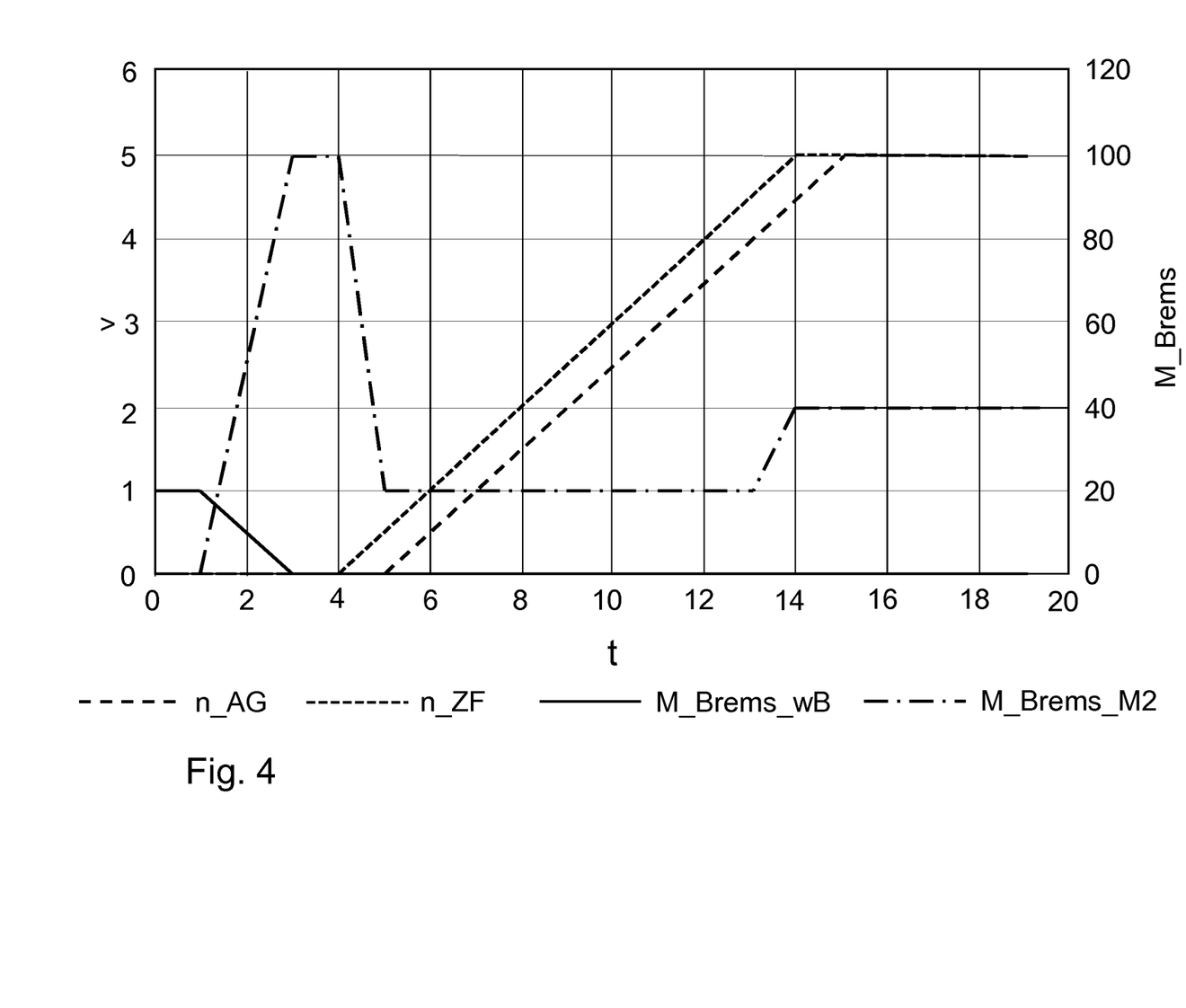
FIG. 4 shows a diagram with profiles of the speeds of the wheels of the first axle and the speed of the second axle, a braking torque applied by the second machine to the second axle, and a braking torque applied by the hand brake to the second axle over time resulting during an exemplary execution of a method according to the invention while starting from a stop and traveling downhill in the direction of forward travel.

This can be seen clearly in FIG. 4, which shows the progression of the speed of the wheels of the second axle 121 of the implement 120 and of the first axle 112 of the towing vehicle 110 over time together with the respectively applied braking torques M_Brems_wB and M_Brems_M2 by the additional braking device and the second machine 150.

The vehicle/trailer unit is first kept at a stop by means of the additional braking device—that is, a braking torque M_Brems_wB (represented by the solid line) is first applied to the second axle 121.

While the additional braking device is being released—that is, when this braking torque M_Brems_wB drops—a braking torque M_Brems_M2 is applied by means of the second electric machine 150 to the second axle 121 of the trailer, so that the wheels 121*l* and 121*r* of the second axle 121 continue to be kept at a stop.

After the additional braking device has been released, the towing vehicle begins to roll, which can be seen clearly here from the speed n_ZF of the wheels 112*l* and 112*r* of the towing vehicle 110, which is symbolized by the broken line.

With increasing speed n_ZF of the towing vehicle 110, more particularly of the wheels 112*l* and 112*r* of the first axle 112, the braking torque M_Brems_M2 being applied by means of the second machine 150 is increasingly reduced until the implement 120, more particularly the wheels 121*l* and 121*r* of the second axle 121, has/have reached the same speed n_AG as the towing vehicle 110, which is represented symbolically by the wide broken line running parallel to the wheel speed of the towing vehicle.

Once the towing vehicle 110 and the implement 120 have reached the same speed n_ZF and n_AG, respectively, the braking torque M_Brems_M2 applied by means of the second electric machine 150 to the second axle 121 of the implement 120 can be increased again in order to set a defined speed n_ZF and n_AG, respectively, thus preventing further acceleration of the vehicle/trailer unit 100.

This makes it possible to start traveling downhill in the direction of forward travel in an especially controlled manner, since the vehicle/trailer unit 100 can be stabilized by setting a defined amount of stretching.

Figure 5:
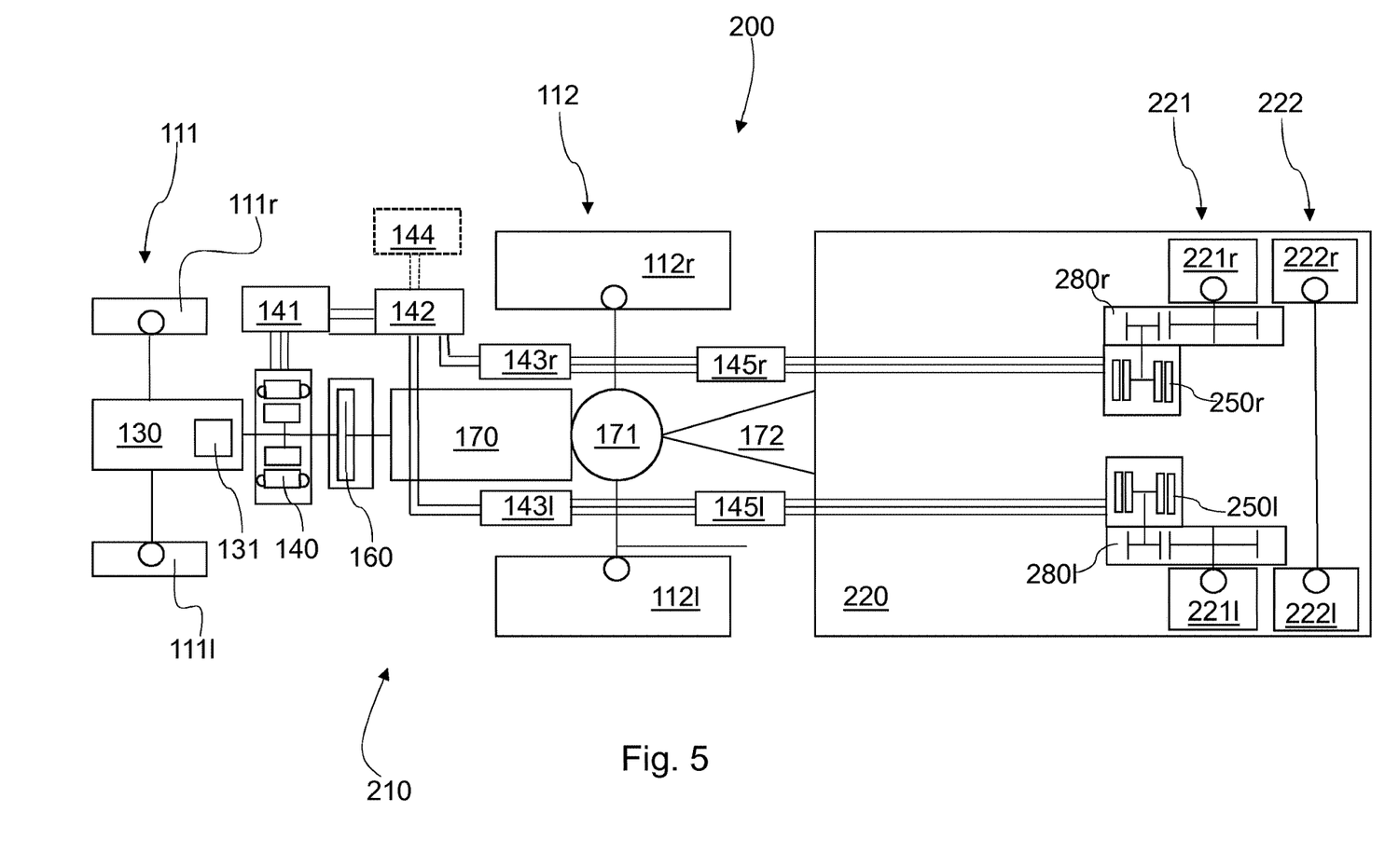
FIG. 5 shows a schematic representation of a second exemplary embodiment of a vehicle/trailer unit according to the invention.

FIG. 5 shows a second exemplary embodiment of a vehicle/trailer unit 200 according to the invention, with this vehicle/trailer unit 200 differing from the vehicle/trailer unit 100 described with reference to the previous figure in that the towing vehicle 210 has two AEF connectors 145*l* and 145*r* via which an electrical energy transfer, particularly in the form of alternating current between towing vehicle 210 and implement 220, can be performed separately for a left side of the implement and towing vehicle and a right side of the implement and towing vehicle, with a separate power converter 143*l* or 143*r* being respectively coupled with the power distribution device 142.

Accordingly, in this exemplary embodiment, the vehicle/trailer unit 200 has a trailer 220 with two electric machines 250*l* and 250*r*, each of which can be operated as an electric motor and as a generator, with one of the two electric machines 250*l* and 250*r* being provided to drive a left wheel 221*l* of the second axle 221 of the implement 220 and one electric machine 250*r* being provided to drive the right wheel 221*r* of the second axle 221. The electric machines 250*l* and 250*r* are each mechanically coupled by means of a separate spur gear 280*l* and 280*r*, respectively, with the respective associated wheel 221*l* and 221*r*.

By means of such a vehicle/trailer unit, it is possible not only to set a defined braking torque distribution between towing vehicle 210 and implement 220, particularly between the first axle 112 of the towing vehicle 210 and the second axle 221 of the implement 220, but also to set a desired, defined braking torque distribution particularly on the implement 220 between the left side and the right side, that is, between the left wheel 221*l* and the right wheel 221*r*. In this way, an even further improved stabilization of the vehicle/ trailer unit 200, particularly of the implement 220, particularly in implements in the form of heavy trailers, can be achieved.

As will readily be understood, a multitude of modifications are possible without departing from the scope of the patent claims.

LIST OF REFERENCE SYMBOLS 100, 200 vehicle/trailer unit according to the invention
110, 210 towing vehicle according to the invention
120, 220 implement according to the invention
111 front axle of the towing vehicle
111*l*, 111*r* left and right wheel, respectively, of the front axle of the towing vehicle
112 first axle, rear axle of the towing vehicle
112*l*, 112*r* wheels of the rear axle of the towing vehicle
121, 221 second axle
121*l*, 121*r*, wheels of the second axle of the implement
221*l*, 221*r*
122, 222 additional axle of the implement
122*l*, 122*r*, wheels of the additional axle of the implement
222*l*, 222*r*
130 combustion engine
131 engine braking device
140 first machine
141 grounded power converter AC/DC
142 power distribution device
143, 143*l*, 143*r* grounded power converter DC/AC
144 energy store
145, 145*l*, 145*r* AEF connector
150, 250*l*, 250*r* second machine
160 clutch
170 gearbox
171 rear axle differential
172 drawbar
180, 280*l*, 280*r* spur gear
181 Cardan shaft
190 axle differential
Ee electrical energy
Em mechanical energy
n_AG speed of the wheels of the second axle
n_ZF speed of the wheels of the first axle
M_Brems_wB braking torque applied by hand brake
M_Brems_M2 braking torque applied by second machine
t time

What is claimed is:

1. A method for operating a vehicle/trailer unit, the method comprising:
providing a vehicle/trailer unit comprising:
a towing vehicle, and
an implement that can be mechanically connected to the towing vehicle and coupled therewith,
wherein the towing vehicle has a combustion engine and a first machine that can be operated as a prime mover, as well as a first axle that can be driven by means of the combustion engine, with the combustion engine being drivable by means of the first machine, and
wherein the implement has a second machine that can be operated as a work machine and a second axle that is mechanically coupled with the second machine,
operating the vehicle/trailer unit in an overrun mode and/or a braking mode, and when operating the vehicle/trailer unit in the overrun mode and/or the braking mode also:
operating the vehicle/trailer unit at least intermittently in a first operating mode,
operating the second machine as a work machine and driving the second machine by means of kinetic energy of the second axle, and
operating the first machine as the prime mover and the first machine driving the combustion engine,
utilizing at least a portion of the energy generated by the second machine to drive the first machine,
controlling the first machine and/or the second machine such that a defined engine braking torque is applied to the first axle of the towing vehicle and/or a defined braking torque is applied to the second axle of the implement, and
setting a braking torque distribution such that a defined stretching or compressing of the vehicle/trailer unit occurs.

2. The method for operating the vehicle/trailer unit as set forth in claim 1, further comprising operating the vehicle/trailer unit at least intermittently in the overrun mode when traveling downhill and/or at least intermittently in the braking mode when traveling downhill in the first operating mode.

3. The method for operating the vehicle/trailer unit as set forth in claim 1, wherein the towing vehicle has an engine braking device, and wherein the method further comprises applying a defined engine braking torque at least intermittently by means of the engine braking device to the first axle of the towing vehicle.

4. The method for operating the vehicle/trailer unit as set forth in claim 1, further comprising applying a defined braking torque at least intermittently by means of the second machine to the second axle of the implement.

5. The method for operating the vehicle/trailer unit as set forth in claim 3, wherein the vehicle/trailer unit has a control device for controlling the first machine and/or the engine braking device and/or the second machine, and wherein the method further comprises controlling the first machine and/or the engine braking device and/or the second machine such that the defined engine braking torque is applied to the first axle of the towing vehicle and/or the defined braking torque is applied to the second axle of the implement.

6. The method for operating the vehicle/trailer unit as set forth in claim 5, further comprising controlling the first machine and/or the engine braking device and/or the second machine such that a defined braking torque distribution is set between the engine braking torque applied by means of the first machine and/or the engine braking device to the first axle of the towing vehicle, and the braking torque applied by means of the second machine to the second axle of the implement.

7. The method for operating the vehicle/trailer unit as set forth in claim 1, wherein in order to bring about the defined stretching of the vehicle/trailer unit when starting downhill in a direction of forward travel, in order to start downhill from a braked stop in the direction of forward travel in which the vehicle/trailer unit is held by means of an additional braking device,
in a first step upon release of the additional braking device, controlling the second machine such that a braking torque is applied by means of the second machine to the second axle of the implement such that the implement is held at a stop until the defined stretching of the vehicle/trailer unit has been achieved as a result of the forward motion of the towing vehicle after the additional braking device is released, in a second step, gradually reducing the braking torque applied by means of the second machine such that the defined stretching that is achieved remains nearly constant until the implement has reached the same driving speed as the towing vehicle, in case of further acceleration of the implement, increasing the braking torque as necessary in one or more steps by means of the second machine such that the defined stretching continues to be maintained while traveling downhill.

8. A vehicle/trailer unit, wherein the vehicle/trailer unit comprises:

a towing vehicle, and an implement that can be mechanically connected to the towing vehicle and coupled therewith, wherein the towing vehicle has a combustion engine and a first machine that can be operated as a prime mover, as well as a first axle that can be driven by means of the combustion engine, with the combustion engine being drivable by means of the first machine, wherein the implement has a second machine that can be operated as a work machine and a second axle that is mechanically coupled with the second machine, wherein the vehicle/trailer unit is embodied such that at least a portion of an energy generated by the second machine can be utilized to drive the first machine, wherein the vehicle/trailer unit has a control device for controlling the first machine and/or the second machine, wherein the first machine and/or the second machine are controlled such that a defined engine braking torque is applied to the first axle of the towing vehicle and/or a defined braking torque is applied to the second axle of the implement, and wherein a braking torque distribution is set such that a defined stretching or compressing of the vehicle/trailer unit occurs.

9. The vehicle/trailer unit as set forth in claim 8, wherein the first machine is an electric machine that can be operated as an electric motor, a turbomachine that can be operated as a turbine, or a reciprocating piston engine, and the second machine is an electric machine that can be operated as a generator or a turbomachine that can be operated as a pump.

10. The vehicle/trailer unit as set forth in claim 8, wherein the first machine of the towing vehicle can also be operated as a work machine and the second machine of the implement can also be operated as a prime mover, and the second axle of the implement, which is mechanically coupled with the second machine, can be operated by means of the second machine, that the vehicle/trailer unit has a device for determining at least one driving state, that the vehicle/trailer unit can be operated in a first operating mode or in at least one additional operating mode as a function of a determined driving state, that, in the first operating mode, in which the vehicle/trailer unit is in an overrun mode and/or a braking mode:

the second machine is operable as the work machine and driven by means of kinetic energy of the second axle, and the first machine is operable as the prime mover and drives the combustion engine, that, in the at least one additional operating mode:

the first machine is operable as the work machine and driven by the combustion engine, and the second machine is operable as the prime mover and drives the drivable axle of the implement, and that the first machine and the second machine are coupled together such that energy that is generated by the first machine can be utilized to drive the second machine.

11. The vehicle/trailer unit as set forth in claim 8, wherein the first machine and/or the second machine is an electric machine that can be operated both as an electric motor and as a generator, or a turbomachine that can be operated as a turbine or as a pump.

12. The vehicle/trailer unit as set forth in claim 8, wherein the towing vehicle has an engine braking device, wherein an engine braking torque can be applied by means of the engine braking device at least to the first axle of the towing vehicle.

13. The vehicle/trailer unit as set forth in claim 12, wherein the engine braking device has an exhaust braking device.

14. The vehicle/trailer unit as set forth in claim 12, wherein the engine braking device has a decompression braking device.

15. The vehicle/trailer unit as set forth in claim 12, wherein the engine braking device has a vented braking device.

16. The vehicle/trailer unit as set forth in claim 12, wherein the control device is capable of controlling the first machine and/or the engine braking device, with it being possible for the first machine and/or the engine braking device to be controlled such that the defined engine braking torque can be applied to the first axle of the towing vehicle.

17. The vehicle/trailer unit as set forth in claim 8, wherein the control device is capable of controlling the second machine, such that a defined torque can be applied to the second axle of the of the implement.

18. The vehicle/trailer unit as set forth in claim 16, wherein a defined braking torque distribution can be set between the engine braking torque that can be applied by means of the first machine and/or the engine braking device to the first axle of the towing vehicle, and the braking torque that can be applied by means of the second machine to the second axle of the implement.

19. A towing vehicle, wherein the towing vehicle is designed to form a vehicle/trailer unit as set forth in claim 8 in at least one mechanically coupled state with an implement.

* * * * *

UNITED STATES PATENT AND TRADEMARK OFFICE
CERTIFICATE OF CORRECTION

PATENT NO. : 10,899,353 B2
APPLICATION NO. : 15/574616
DATED : January 26, 2021
INVENTOR(S) : Siegfried Anschuber and Gerhard Stempfer It is certified that error appears in the above-identified patent and that said Letters Patent is hereby corrected as shown below:

On the Title Page

In item (73), "Steyt" should read --Steyr--.

In the Specification

Column 1, Line 14, the text "filed 20 May April 2015" should read --filed 20 May 2015--.

In the Claims

Column 18, Lines 41-42, the text "the second machine, such that" should read --the second machine such that--; Line 43, the text "second axle of the of the implement" should read --second axle of the implement--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*